United States Patent [19]

Szemplenski et al.

[11] Patent Number: 4,674,267
[45] Date of Patent: Jun. 23, 1987

[54] PROCESSING AND PACKAGING SYSTEM FOR FLEXIBLE CONTAINERS

[75] Inventors: Thomas E. Szemplenski, Overland Park; Warren R. Schack, Leawood; Richard G. Powers, Overland Park, all of Kans.

[73] Assignee: Marlen Research Corporation, Overland Park, Kans.

[21] Appl. No.: 868,950

[22] Filed: May 30, 1986

[51] Int. Cl.⁴ .................. B65B 55/14; B65B 31/02
[52] U.S. Cl. .............................. 53/432; 53/440; 53/127
[58] Field of Search ............ 53/432, 440, 91, 94, 53/127; 99/355, 356, 470, 483, 532; 426/392, 397, 410; 141/51, 82

[56] References Cited

U.S. PATENT DOCUMENTS

| | | |
|---|---|---|
| 2,029,303 | 2/1936 | Ball . |
| 2,540,120 | 2/1951 | Jacobs et al. ............... 53/91 X |
| 2,684,803 | 7/1954 | Birkland et al. ............ 53/94 |
| 2,685,520 | 8/1954 | Martin ....................... 53/432 X |
| 2,870,024 | 1/1959 | Martin . |
| 3,138,178 | 6/1964 | Martin . |
| 3,235,388 | 2/1966 | Francis . |
| 3,241,475 | 3/1966 | Schack et al. . |
| 3,255,690 | 6/1966 | Schack et al. . |
| 3,477,192 | 11/1969 | Brown et al. ............... 53/432 |
| 3,718,082 | 2/1973 | Lipoma . |
| 3,913,299 | 10/1975 | Stenstrom . |
| 4,539,903 | 9/1985 | Sugisawa et al. . |
| 4,560,567 | 12/1985 | Rausing . |

Primary Examiner—Horace M. Culver
Attorney, Agent, or Firm—Schmidt, Johnson, Hovey & Williams

[57] ABSTRACT

An improved heating, packaging and sterilization system for pumpable particulate food product (e.g., soups, stews, fruits) is provided which makes use of an upstream pump and an automated packaging chamber maintained at superatmospheric pressure to achieve precise processing control without deleterious overcooking or flashing of the food product. The upstream pump is coupled to the chamber via a constant diameter conduit, and the open delivery end of the latter is in direct communication with the pressurized interior of the packaging chamber; in this way the easily controllable chamber pressure provides back pressure within the product conduit, so that a substantially uniform decreasing pressure gradient and essentially plug product flow are established throughout the length of the conduit from the pump to the chamber. Moreover, the chamber pressure is of sufficient magnitude to prevent flashing throughout the system. In practice, the packaging chamber is relatively small inasmuch as it is not intended to normally house plant personnel, and can accommodate either flexible web form, fill and seal packaging equipment or conventional canning units. The product pump is advantageously a dual piston food pump coupled with downstream steam-fed scraped surface heat exchangers.

10 Claims, 3 Drawing Figures

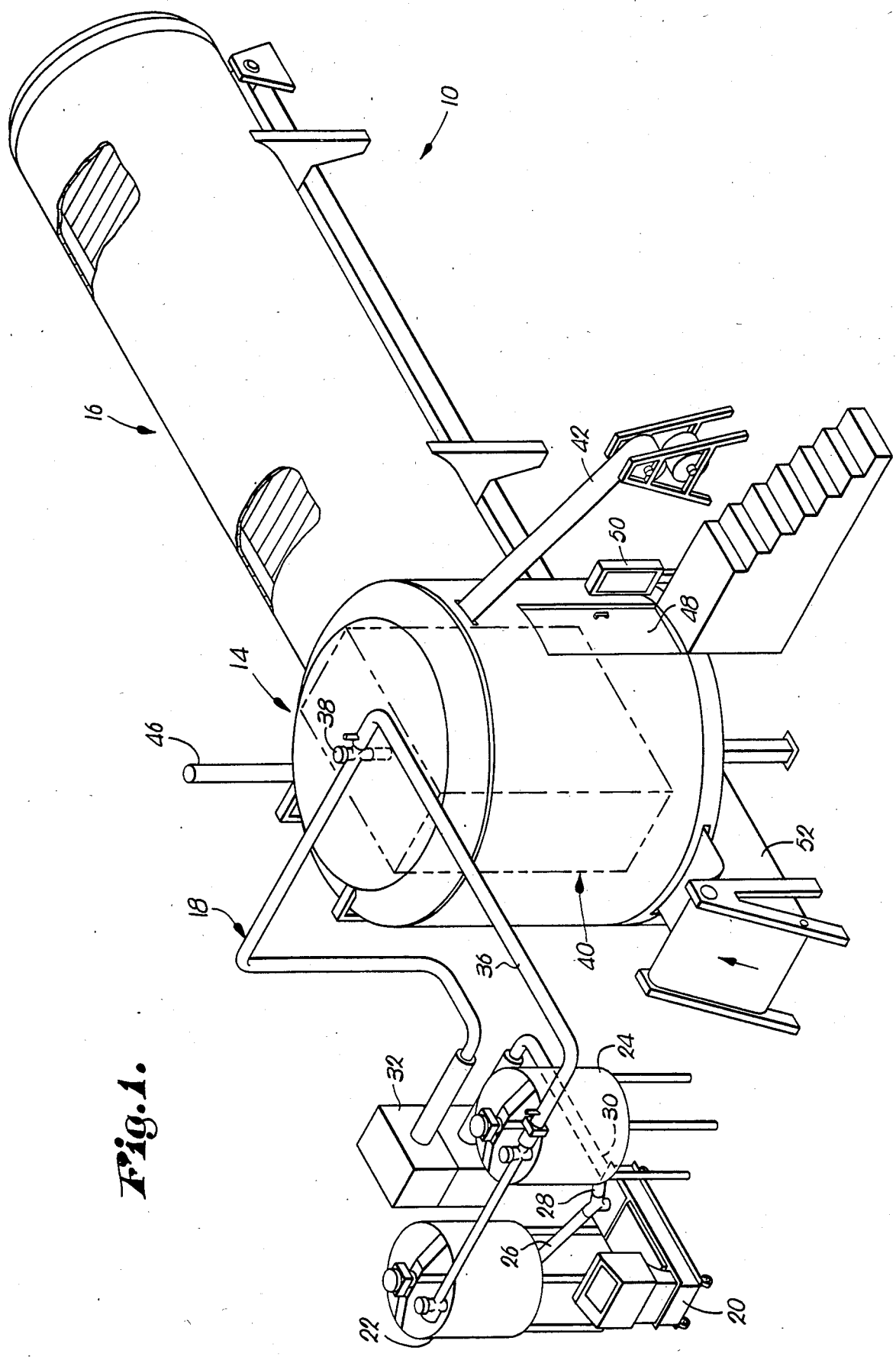

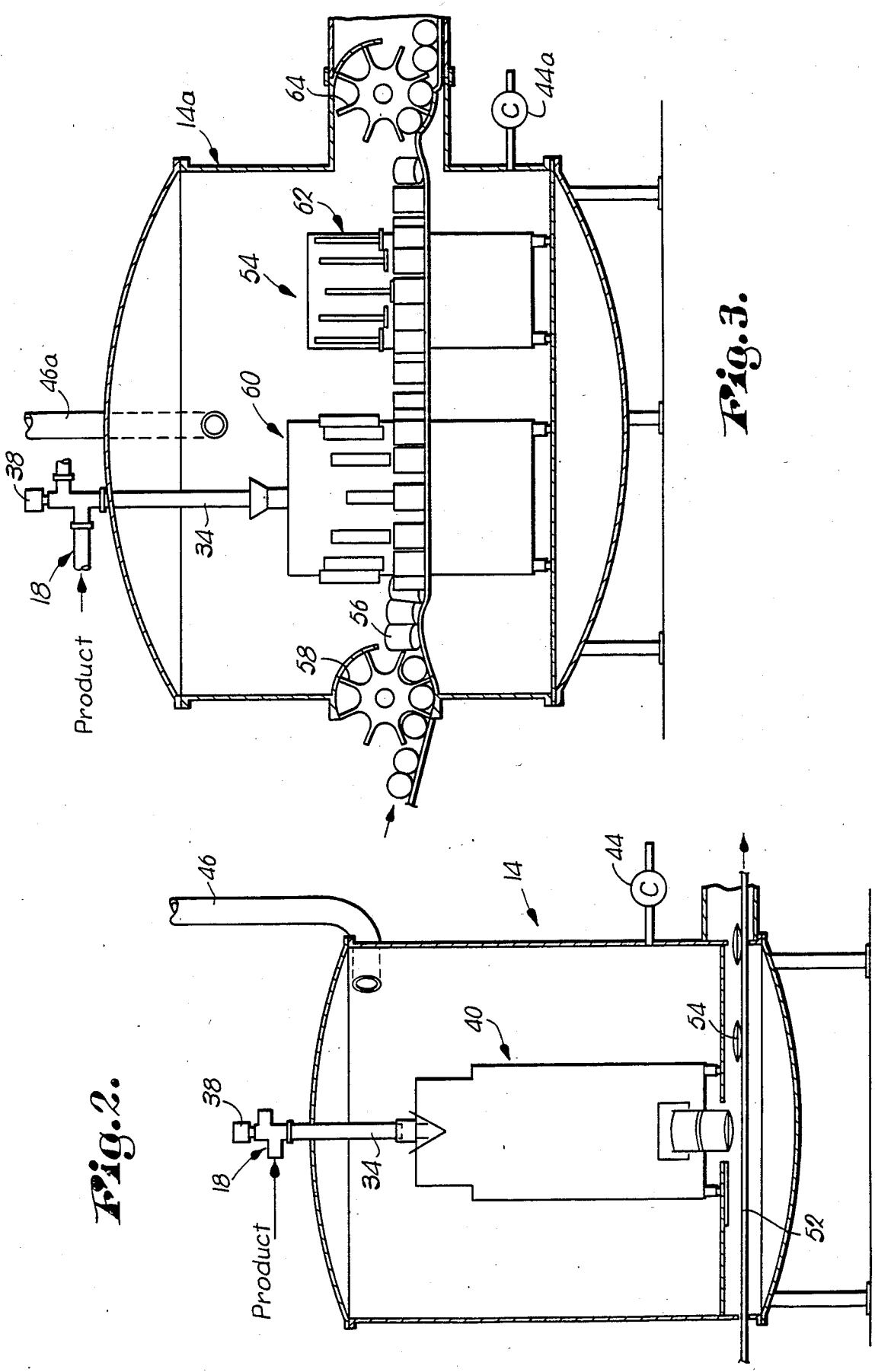

PROCESSING AND PACKAGING SYSTEM FOR FLEXIBLE CONTAINERS

BACKGROUND OF THE INVENTION

1. Field of the Invention

The present invention is broadly concerned with an improved method and apparatus for heating, packaging and sterilization of pumpable particulate food products under closely controlled temperature and pressure conditions which eliminate overcooking and flashing of the product with consequent beneficial effects on the organoleptic properties of the products. More particularly, it is concerned with such a method and apparatus making use of a pressurized packaging chamber in direct, open communication with a product delivery line, so that the superatmospheric chamber pressure provides back pressure for the product line; in this fashion, the easily controllable filling chamber pressure assures essentially plug product flow and a substantially uniform, decreasing pressure gradient throughout the length of the product conduit.

2. Description of the Prior Art

The canning and retorting of food products such as soups, stews, chilies and other items are conventional and well established processes. A common complaint about such canned foods, however, resides in the unnatural flavor attributable to the canning and retorting process. That is to say, it is absolutely essential that such products be adequately sterilized to avoid spoilage, and as a consequence processors have tended to effectively overcook the products in order to assure proper sterilization. This in turn creates the overcooked, unnatural flavor characteristic of so many canned items.

U.S. Pat. No. 3,241,475 describes a canning procedure somewhat different than the conventional technique. The method and apparatus described in this patent has been commercialized for a number of years as the so-called "Flash 18" process. In this technique, a food to be processed is first pumped through a pair of series-connected upstream lobe-type feed pumps, whereupon the product passes through either an indirect heat exchange cooking unit or a zone of steam injection. Thereupon, additional moisture may be added to the product and it passes through yet another lobe-type back pressure pump. At this point, the product may pass through a flash deaerator in order to lower the product pressure and temperature, whereupon the product passes through a fourth lobe-type pump and is directed to a packaging chamber. The packaging chamber itself is in the form of a relatively large, pressurized building accommodating canning equipment and plant personnel. In the chamber, product from the deaerator is canned in the usual fashion, and is then sent to a sterilizing and cooling station exteriorly of the chamber.

While the described "Flash 18" process has been in use for a number of years, it presents a number of problems from the standpoint of product integrity, particularly in the case of large particulate products. Specifically, the use of multiple lobe-type pumps for propelling the product through the processing line and establishing back pressure therewithin inevitably creates substantial pressure variations and a non-uniform pressure gradient throughout the product line. As a consequence, in order to avoid premature flashing of the product, there must be a substantial pressure differential between the steam pressure within the indirect heat exchange jackets or as injected, and the product pressure. In practice, this pressure differential has been in the range of 15 to 20 p.s.i.g. Furthermore, inasmuch as this relatively high pressure differential is established within the product line, in most instances it is necessary to flash deaerate product prior to entering the pressurized filling chamber. Such deaeration of course presents another zone of rapid pressure change within the product line upstream of the filling chamber, and can in and of itself detract from particulate integrity.

SUMMARY OF THE INVENTION

The present invention overcomes the problems noted above and provides a greatly improved method and apparatus for the heating, packaging and sterilization of pumpable food products. Broadly speaking, a system in accordance with the invention includes means for continuously supplying a heated stream of food product under pressure including an upstream pumping device (e.g., a twin piston food pump of the type commercialized by Marlen Research Corporation of Overland Park, Kans.), an elongated product delivery conduit coupled with the pumping device presenting an open delivery end, and means such as an indirect steam fed heat exchanger located between the pumping device and output end of the conduit for heating of the food product stream. A pressurizable packaging chamber is also provided in accordance with the invention, with the open end of the product conduit being in communication with the interior of this chamber. Packaging means is situated within the chamber for continuously receiving heated product, packaging the same into desired individual sealed packages, and for passing such packages out of the chamber.

Powered means such as a conventional air compressor is provided for creating super-atmospheric pressure conditions within the chamber interior, in order to thereby also create back pressure conditions within the product delivery conduit which resists flow of the food product; such line back pressure obtains by virtue of the open communication between the chamber interior and the open end of the product delivery conduit. The conduit is designed for establishing, in cooperation with the pumping device and chamber-pressurizing means, a substantially uniform decreasing pressure gradient throughout the length of the conduit from the pumping device to the outlet end. Advantageously, the conduit is imperforate and is of substantially constant diameter throughout the length thereof, in order to further establish essentially plug flow conditions of the product between the upstream pumping device and the packaging chamber.

Inasmuch as the packaging chamber pressure can be readily and rather precisely controlled, it follows that the conduit back pressure is likewise readily controllable and constant. As a consequence, the system of the present invention can be designed with a smaller pressure differential between the vapor pressure of the liquid in the product and the steam pressure (either within jackets forming a part of scraped surface heat exchangers or as directly injected), while still ensuring that no flashing of the product occurs. That is to say, in the preferred method and apparatus of the invention, the product never flashes or boils, i.e., the pressure conditions are maintained such that, at the operating temperatures desired, essentially no moisture is allowed to vaporize.

In preferred forms of the present invention, the upstream product pump is in the form of a dual piston Marlen food pump, whereas the downstream heating apparatus comprises one or a plurality of serially interconnected scraped surface heat exchange units. The packaging chamber on the other hand is sized to accommodate the automated packaging equipment (e.g., roll stock-fed form, fill the seal equipment or conventional canning units), but is not of a size for regularly accommodating service personnel. Hence, the chamber can be relatively smaller than the described "Flash 18" process which employs a chamber of sufficient size to hold a number of persons in addition to extra cooking equipment and the like.

A sterilizing/cooling tunnel unit is also advantageously coupled with the packaging chamber, and is designed to receive the individual packages of food product in order to complete the sterilization thereof and thereafter cool the product to ambient temperatures. Such units are known, and in practice a "Hydrolock" continuous cooker/cooler commercialized by the Rexham Company of Rockford, Ill. can be used to good effect in the invention.

BRIEF DESCRIPTION OF THE DRAWINGS

FIG. 1 is a somewhat schematic perspective view of a heating, packaging and sterilizing system in accordance with the present invention.

FIG. 2 is a schematic vertical sectional view illustrating the packaging chamber forming a part of the apparatus depicted in FIG. 1; and FIG. 3 is a view similar to that of FIG. 2, but depicts a packaging chamber housing conventional canning equipment as opposed to the flexible film form, fill and seal equipment illustrated in FIG. 2.

DESCRIPTION OF THE PREFERRED EMBODIMENTS

Turning now to the drawings, a system 10 in accordance with the invention broadly includes an upstream product heating assembly 12, a pressurizable packaging chamber 14, a continuous cooker/cooler 16 operatively coupled to the chamber 14, and a product delivery conduit 18.

In more detail, the assembly 12 includes an upstream dual piston food pump 20 which is designed to be operated in a constant flow rate mode and to deliver a continuous stream of a food product. The depicted pump is of the type commercialized by Marlen Research Corporation for particulate food products. A pair of product kettles 22, 24 are also provided adjacent pump 20, and are coupled by means of appropriate pipes 26, 28 to the inlet of the pump. In this fashion, the kettles cooperatively provide a continuous flow product to the pump on a batch-continuous basis.

The upstream end 30 of conduit 18 is directly coupled to the outlet of pump 20. The initial section of the overall conduit 18 is in turn coupled to the inlet of a schematically depicted scraped surface heat exchanger 32. The latter exchanger is of the type commercialized by the Cherry Burrell Company, and includes external steam jackets for indirect heating of product passing through the exchanger. Although not specifically illustrated in the drawing, it is to be understood that one or more such exchanger units could be provided; when plural units are employed, these would be serially connected.

In any event, conduit 18 is coupled to the outlet of exchanger 32 and extends to the upper wall of chamber 14 as illustrated. A vertical delivery pipe 34 is connected to the adjacent end of conduit 18, with the open end of the pipe 34 being in communication with the interior of chamber 14 (see FIG. 2). Furthermore, a product recycle conduit 36 is operatively coupled to the vertical pipe 34, and a valve 38 is provided for directing product flow either downwardly through pipe 34 or through the recycle conduit. Again referring to FIG. 1, it will be seen that the recycle conduit is configured to dump product into either of the kettles 22, 24 as desired, and appropriate valving is provided for this purpose.

The chamber 14 is in the form of an upright, sealed hollow structure of a size to accomodate packaging equipment broadly referred to to the numeral 40 (see FIG. 2). In the form illustrated, packaging equipment 40 is designed to form, fill and seal flexible packages formed from a continuous web 42 of synethetic resin packaging film. Such form, fill and seal equipment is well known, and is illustrated in U.S. Pat. No. 3,160,367; this patent is incorporated by reference herein. In addition, although not specifically illustrated, the packaging equipment 40 is designed to fill the individual packages with nitrogen or other inert gas as may be desirable in the case of certain food products.

The overall chamber 14 is further provided with powered means such as a air compressor 44 for establishing superatmospheric conditions within the interior of the chamber. The magnitude of such superatmospheric pressure varies with the product being handled, but typically would range from 10 to 50 p.s.i.g. A valved relief line 46 is also in communication with the interior of chamber 14 in order to permit selective depressurization of the chamber as required.

Referring particularly to FIG. 1, it will be seen that an access door 48 is provided with the chamber 14, in order to permit selective entry of service personnel into the confines of the chamber. However, the chamber is not designed for normal working in and around the automated packaging equipment 40. To this end, a control console 50 is situated exteriorly of the chamber 14 to allow operator control of the packaging apparatus 40 without entry into the chamber 14.

The continuous cooker/cooler 16 is a conventional unit of the type described in a sales brochure distributed by the Rexham Company of Rockford, Ill. under the title "Hydrolock TM Continuous Cooker/Cooler." This brochure is incorporated by reference herein. Briefly, however, the cooker/cooler device is designed to receive individual packages of food products in order to subject these to short time high temperature sterilization followed by cooling and depressurization to ambient temperatures and pressures. Referring to FIGS. 1 and 2, it will be seen that a continuous transfer belt 52 serves to operatively connect the interior chamber 14 and the cooker/cooler 16. As illustrated, this belt passes through the bottom of chamber 14 (with appropriate, conventional airlock structure being provided to maintain superatmospheric pressure conditions within the chamber) in order to receive and transport individual packages 54 of food product. These packages are thence transported via the belt 52 to the cooker/cooler 16 for appropriate further processing therein.

Although a packaging apparatus 40 designed to produce flexible pouch-type packages is illustrated in FIGS. 1 and 2, the invention is not so limited. Specifically, somewhat larger chamber 14a could also be provided as desired, to house conventional canning equipment 54. Here again, the vertical delivery pipe 34 extends through the top wall of the chamber 14a with the open end of the delivery pipe being in communication with the interior of the chamber. In like manner, a vent pipe 46a is coupled to the chamber chamber 14a.

The equipment 54 is designed to receive empty containers 56 through a vaned airlock 58, whereupon the containers are filled at station 60 and sealed at station 62. The finished containers then pass through a secondary airlock 64 to the continuous cooker/cooler 16 for downstream sterilization and cooling.

Superatmospheric pressure conditions within the chamber 14a are established by means of the powered air compressor 44a, as those skilled in the art will readily appreciate.

A particular advantage of the present invention stems from the fact that the conduit 18 is in open communication with the interior of the pressurizable packaging chamber. As a consequence, the superatmospheric conditions within this chamber create back pressure conditions within the conduit 18 which resist flow of food product. The conduit (and heat exchange means where appropriate) are designed for establishing, in cooperation with the pumping device and the chamber-pressurizing means, a substantially uniform decreasing pressure gradient throughout the length of the conduit from the pumping device 20 to the outlet end of the delivery pipe 34. It will be noted in this respect that the line 18 is completely free of powered pumps or the like for creating back pressure, in sharp contrast with the system described in U.S. Pat. No. 3,241,475. This also ensures that the flow of product within the conduit 18 is essentially plug-type in order to avoid particulate disruptions.

In practice, it has been found that a uniform decreasing pressure gradient can be maintained which varies no more than about 10 percent per unit length of the conduit 18, as compared with the overall average gradient. That is to say, and considering a hypothetical situation with a conduit having an effective length of 10 feet and a total pressure drop between the outlet of pump 20 and the discharge end of pipe 34 of 20 p.s.i.g, the average pressure gradient over the entire conduit 18 would 20 p.s.i.g./10 ft. or 2 p.s.i.g./ft. Under this hypothetical, it is preferred that, for any given foot of length of the conduit 18, the pressure gradient within that unit length should vary no more than ±10 percent from the overall average of 2 p.s.i.g./ft., or from 1.8-2.2 p.s.i.g./ft.

In those cases where indirect steam fed heat exchange devices are employed, the steam pressure of the steam fed to the exchanger jackets should be at least 5 p.s.i.g., and preferably 5-10 p.s.i.g. below the corresponding product pressure within the conduit 18 and the exchanger. In this way, it is possible to ensure that no unwanted flashing of the product occurs, while nevertheless maintaining the processing conditions as gentle as possible in order to enhance product integrity and the organoleptic properties of the final packaged material.

EXAMPLES

The following specific examples of the preferred apparatus and methods in accordance with the invention illustrate typical processing techniques for three types of food products to be heated, packaged and sterilized using the apparatus of FIGS. 1 and 2. In all instances the pump is a Marlen A629 dual piston pump commercialized by Marlen Research Corporation of Overland Park, Kans. operated in the constant flow rate mode. Two serially connected heat exchangers are used, and are conventional scraped surface units such as those sold by the Cherry Burrell Company. The product line from the pump to the pressurized packaging chamber is of 2-inch diameter and is free of back pressure pumps and significant flow restrictions.

| I. CORNED BEEF HASH | |
|---|---|
| Formula | Percent |
| Double ground beef trimmings | 60.0 |
| Dehydrated potatoes | 12.0 |
| Salt | 2.0 |
| Sugar | 1.0 |
| Seasonings | 0.7 |
| Water | 24.3 |
| | 100.0 |

The heat exchanger system is adjusted to provide 255° F. water at a 16 lb/minute flow rate. Then the mixed, preheated hash formula, at approximately 150° F. is drawn into the piston loading chamber of the Marlen pump and pumped to the heat exchanger at 16 lbs/minute. Back pressure on the product is supplied by the pressurized packaging chamber. This chamber is carried at 25 p.s.i.g. which results in approximately 35 p.s.i.g product pressure at the entry into the product pipe from the Marlen pump. Sufficient sq. in. of heating surface and holding tube length are used to provide heating from 150° F. to the fill temperature of 255° F., while keeping the jacket heating steam at least 5 p.s.i.g. (and preferably 5–10 p.s.i.g.) below the corresponding product pressure.

By virtue of the accurate control of both back pressure and product flow rate provided by the system, the pressure differential maintains the product pressure sufficiently high to be in excess of the liquid phase vapor pressure at the temperatures encountered at the heating surface during the heating phase. Hence, no flashing or boiling of the product is encountered.

The product at 255° F. is then filled into formed, flexible non-rigid containers. Heated nitrogen gas is continuously added along with the product into the container during the filling and sealing cycle to provide an inert gas atmosphere of nitrogen.

The filled containers are then passed to a sterilization/cooling chamber and are held in a 255° F. steam atmosphere at 25 p.s.i.g. for five minutes to ensure sterilization. After sterilization, they are chilled under an 18 p.s.i.g. pressure which is gradually reduced to atmospheric pressure (0 p.s.i.g.) as the product cooled from approximately 255° to 212° F. Final spray chilling to 100° F. is completed at atmospheric pressure.

| II. BEEF STEW | |
|---|---|
| Formula | Percent |
| Cubed Beef | 29.0 |
| Potatoes | 33.0 |
| Carrots | 10.0 |
| Onions | 5.0 |
| Seasonings | 4.5 |
| Water | 18.5 |
| | 100.0 |

The formula is mixed and heated to approximately 145° F., then drawn from the kettles into the piston loading chamber of the Marlen pump. At the same time, the heat exchanger is adjusted to provide 255° F. water at 16 lbs/minute. Product is pumped to the heat exchanger at 16 lbs/minute. Back pressure is applied to the system using the pressure in the packaging chamber which is carried at 30 p.s.i.g. This back pressure results in approximately 40 p.s.i.g. at the entry from the pump into the product pipe line. The first scraped surface heater utilizes approximately 272° F. steam, and the second approximately 267° F. steam to provide 255° F. product temperature to the filling chamber. Product is filled into formed, flexible, non-rigid containers. During the fill cycle, heated nitrogen gas is continuously added along with the product until the sealing cycle.

The filled, sealed containers are held at 30 p.s.i.g. in a 255° F. steam atmosphere for six minutes to complete the sterilization. After sterilization, the containers are chilled under an 18 p.s.i.g. pressure which is gradually reduced to atmospheric pressure (0 p.s.i.g.) as product cooled from approximately 255° F. to 212° F. Final spray chilling to 100° F. is carried out at atmospheric (0 p.s.i.g.) pressure.

| III. DICED PEARS IN SYRUP | |
| --- | --- |
| Formula | Percent |
| Diced Pears - ½" | 80.0 |
| 14° Brix Sucrose Solution | 20.0 |
| | 100.0 |

The heat exchanger system is adjusted to provide 205° F. water at a 16 lbs/minute flow rate. Then the mixed formula from the kettle (at approximately 80° F.) is drawn into the piston loading chamber of the Marlen pump. On the next piston cycle, the water is replaced with product using the same pumping rate. Back pressure on the product was supplied by the pressurized packaging chamber which is carried at 10 p.s.i.g. This pressure provides approximately 20 p.s.i.g. at the pipe line entry from the Marlen pump. The product is heated to 205° F., without exceeding the 239° F. steam temperaature supplied to the heat exchangers.

Product at 205° F. is filled into formed, flexible, non-rigid containers in the 10 p.s.i.g. chamber. After filling and sealing, the containers are held in a 205° F. atmosphere at 10 p.s.i.g. for three minutes to complete the sterilization process. After sterilization, they are chilled under a 5 p.s.i.g. pressure which is gradually reduced to atmospheric (0 p.s.i.g.) whereupon the product is spray cooled to approximately 100° F.

We claim:

1. A system for continuously heating and packaging a pumpable food product, said system comprising:
    means for continuously supplying a heated stream of food product under pressure, including an upstream pumping device, an elongated product delivery conduit operably coupled with said device and presenting an open delivery end, indirect steam-fed heat exchange means located between said device and conduit delivery end and operably interposed in said conduit for heating of the food product stream;
    means defining a pressurizable packaging chamber;
    packaging means situated within said chamber for continuously receiving said heated product stream, for packaging desired portions thereof into individual sealed packages, and for passing said packages out of said chamber,
    said open end of said conduit being within said chamber, adjacent said packaging means for directly feeding product thereto, and in open communication with the interior of the chamber,
    said system including structure for maintaining said product at substantially the same temperature between said heat exchanger means and said packaging means; and
    powered means operably coupled with said chamber for creating superatmospheric pressure conditions within the chamber interior, in order to thereby also create back pressure conditions within said product delivery conduit resisting flow of said food product by virtue of the open communication between said chamber interior and conduit open end,
    said conduit and heat exchange means including structure for establishing, in cooperation with said device and said chamber-pressurizing and back pressure creating means, a substantially uniform decreasing pressure gradient throughout the length of said conduit from said device to said delivery end, and pressures within said system greater than the vapor pressure within said product for preventing flashing of moisture from the product.

2. The system of claim 1, said conduit and heat exchange means being imperforate and of substantially constant diameter throughout the length thereof.

3. The system of claim 1, said pumping device comprising a dual piston pump.

4. The system of claim 1, said heat exchange means comprising an indirect scraped surface heat exchanger.

5. The system of claim 1, said packaging means comprising means for forming, filling and sealing flexible synthetic resin packages.

6. The system of claim 1, said packaging means including canning apparatus.

7. The system of claim 1, including means coupled with said chamber for receiving said packages therefrom, and for sterilizing the packages and the food product therein, and thereafter cooling the packages and food product.

8. The system of claim 1, said chamber pressurizing means being the sole powered means of creating said back pressure within said conduit.

9. In a method of continuously heating and packaging a pumpable food product including the steps of pumping said food product under pressure into and through a product delivery conduit presenting an open delivery end, heating said product during flow thereof towards said delivery end, and packaging said product into individual sealed packages within a pressurizable packaging chamber, the improved method comprising the steps of:
    establishing open communication between said open end and the interior of said chamber;
    using powered means to create superatmospheric pressure conditions within said chamber interior in order to thereby also create back pressure conditions within said conduit resisting said flow of food product by virtue of said open communication;
    maintaining a substantially uniform temperature of said product between said heating and packaging steps; and
    establishing within said conduit and chamber pressure conditions greater than the vapor pressure of said product for preventing flashing of moisture from the product, and a substantially uniform decreasing pressure gradient throughout the length of the conduit from said device to said open end.

10. The method of claim 9, said heating step comprising the step of passing the food product through a jacketed steam-fed indirect heat exchanger, and maintaining the steam pressure within said jacket at a level of from about 5 to 10 p.s.i.g. below the pressure of the product within the conduit.

* * * * *